(12) United States Patent
Sone

(10) Patent No.: US 12,448,474 B2
(45) Date of Patent: Oct. 21, 2025

(54) RUBBER COMPOSITION AND TIRE

(71) Applicant: BRIDGESTONE CORPORATION, Tokyo (JP)

(72) Inventor: Ryota Sone, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 764 days.

(21) Appl. No.: 17/775,149

(22) PCT Filed: Sep. 23, 2020

(86) PCT No.: PCT/JP2020/035869
§ 371 (c)(1),
(2) Date: May 6, 2022

(87) PCT Pub. No.: WO2021/106338
PCT Pub. Date: Jun. 3, 2021

(65) Prior Publication Data
US 2022/0411554 A1    Dec. 29, 2022

(30) Foreign Application Priority Data
Nov. 29, 2019  (JP) .................. 2019-217352

(51) Int. Cl.
| | |
|---|---|
| C08F 236/06 | (2006.01) |
| B60C 1/00 | (2006.01) |
| C08C 19/22 | (2006.01) |
| C08C 19/25 | (2006.01) |
| C08C 19/44 | (2006.01) |
| C08F 212/08 | (2006.01) |
| C08F 236/10 | (2006.01) |
| C08K 3/36 | (2006.01) |
| C08K 5/548 | (2006.01) |
| C08L 15/00 | (2006.01) |

(52) U.S. Cl.
CPC .............. *C08F 236/06* (2013.01); *B60C 1/00* (2013.01); *B60C 1/0016* (2013.01); *C08C 19/22* (2013.01); *C08C 19/25* (2013.01); *C08C 19/44* (2013.01); *C08F 212/08* (2013.01); *C08F 236/10* (2013.01); *C08K 3/36* (2013.01); *C08K 5/548* (2013.01); *C08L 15/00* (2013.01); *Y02T 10/86* (2013.01)

(58) Field of Classification Search
CPC .... C08F 236/06; C08F 212/08; C08F 236/10; B60C 1/0016; B60C 1/00; C08C 19/25; C08C 19/22; C08C 19/44; C08K 3/36; C08K 5/548; C08L 15/00; Y02T 10/86
See application file for complete search history.

(56) References Cited

U.S. PATENT DOCUMENTS

| | | | |
|---|---|---|---|
| 9,623,705 | B2 | 4/2017 | Tanaka et al. |
| 10,533,062 | B2 | 1/2020 | Sohn et al. |
| 10,968,302 | B2 | 4/2021 | Lee et al. |
| 11,254,755 | B2 | 2/2022 | Mun et al. |
| 2010/0016500 | A1 | 1/2010 | Sone et al. |
| 2011/0245398 | A1 | 10/2011 | Hama et al. |
| 2018/0258194 | A1* | 9/2018 | Sohn .................. C08C 19/44 |
| 2018/0312003 | A1* | 11/2018 | Winston .............. C08K 3/36 |
| 2021/0179741 | A1 | 6/2021 | Seo et al. |

FOREIGN PATENT DOCUMENTS

| | | |
|---|---|---|
| CN | 102026826 A | 4/2011 |
| CN | 102206353 A | 10/2011 |
| CN | 108350118 A | 7/2018 |
| CN | 109923136 A | 6/2019 |
| EP | 3536720 A1 | 9/2019 |
| JP | 4478262 B2 | 6/2010 |
| JP | 2013-108043 A | 6/2013 |
| JP | 2014-98066 A | 5/2014 |

(Continued)

OTHER PUBLICATIONS

Chinese Search Report issued Mar. 14, 2024 in Application No. 2020800827431.

(Continued)

*Primary Examiner* — Patrick D Niland
(74) *Attorney, Agent, or Firm* — Sughrue Mion, PLLC

(57) ABSTRACT

Provided is a rubber composition having excellent low heat generating properties. The rubber composition of the present disclosure contains a rubber component, a filler containing silica, and a silane coupling agent, where the rubber component contains a conjugated diene-based polymer modified with a modifier containing a compound represented by the formula (1), and the silane coupling agent is a compound represented by the formula (2).

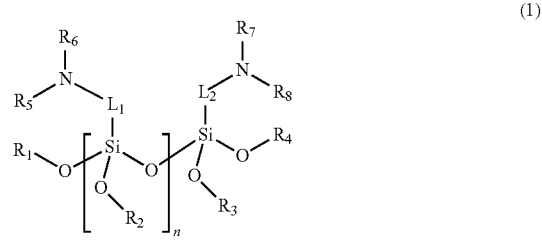

(1)

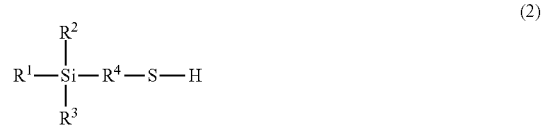

(2)

6 Claims, No Drawings

(56) References Cited

FOREIGN PATENT DOCUMENTS

| JP | 2019-515073 A | 6/2019 |
|----|---------------|--------|
| WO | 2008/050851 A1 | 5/2008 |
| WO | 2009/113546 A1 | 9/2009 |
| WO | 2019/117218 A1 | 6/2019 |
| WO | 2019216645 A1 | 11/2019 |

OTHER PUBLICATIONS

International Preliminary Report on Patentability with the translation of Written Opinion dated May 17, 2022 from International Bureau in International Application No. PCT/JP2020/035869.
International Search Report for PCT/JP2020/035869 dated, Dec. 12, 2020.
Extended European Search Report dated Nov. 22, 2022 in European Application No. 20894218.5.

* cited by examiner

RUBBER COMPOSITION AND TIRE

CROSS REFERENCE TO RELATED APPLICATIONS

This application is a National Stage of International Application No. PCT/JP2020/035869 filed Sep. 23, 2020, claiming priority based on Japanese Patent Application No. 2019-217352 filed Nov. 29, 2019.

TECHNICAL FIELD

This disclosure relates to a rubber composition and a tire.

BACKGROUND

In recent years, the demand for fuel efficiency of automobiles is increasing because of the movement of global carbon dioxide emission regulations caused by the social demand for energy saving and the growing interest in environmental problems. To meet such demand for fuel efficiency, it has been required to reduce the rolling resistance in terms of tire performance. A method of optimizing a tire structure has been studied as a method for reducing the rolling resistance of a tire, but a general method for reducing rolling resistance is to use a material with low heat generating properties as a rubber composition.

Examples of techniques of improving the low heat generating properties of a rubber composition include the one described in JP4478262B (PTL 1), where a rubber composition uses a modified conjugated diene-based polymer as a rubber component, and the modified conjugated diene-based polymer is obtained by reacting a specific imino group-containing hydrocarbyloxysilane compound.

Because the dispersibility of filler is improved in the rubber composition of PTL 1, a certain rolling resistance-reducing effect can be obtained when the rubber composition is applied to a tire. However, the improvement effect of the rubber composition of PTL 1 is insufficient to meet the recent demand for fuel efficiency, and it is desired to further improve the low heat generating properties.

CITATION LIST

Patent Literature

PTL 1: JP4478262B

SUMMARY

Technical Problem

It could thus be helpful to provide a rubber composition having excellent low heat generating properties, and a tire having greatly improved rolling resistance.

Solution to Problem

As a result of studies to solve the above problems, we found that, by using a conjugated diene-based polymer modified with a specific modifier having oligosiloxanes and a tertiary amino group as a rubber component and containing a silane coupling agent having a specific mercapto group, the dispersibility of a filler such as silica can be improved, thereby obtaining excellent low heat generating properties without deteriorating other performance.

We thus provide the following.

The rubber composition of the present disclosure is a rubber composition containing a rubber component, a filler containing silica, and a silane coupling agent, wherein the rubber component contains a conjugated diene-based polymer modified with a modifier containing a compound represented by the formula (1), and the silane coupling agent is a compound represented by the formula (2),

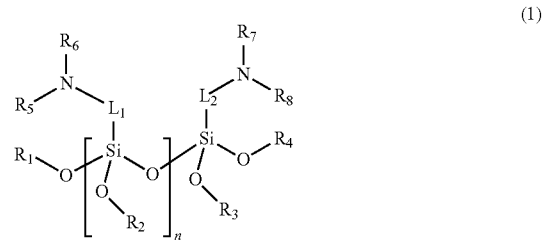

where R1 to R8 are each an independent alkyl group having 1 to 20 carbon atoms; L1 and L2 are each an independent alkylene group having 1 to 20 carbon atoms; and n is an integer of 2 to 4,

where in the formula, $R^1$, $R^2$ and $R^3$ are each independently a group selected from $-O-C_jH_{2j+1}$, $-(O-C_kH_{2k}-)_a-O-C_mH_{2m+1}$, and $-C_nH_{2n+1}$, j, m and n are each independently 0 to 12, k and a are each independently 1 to 12, and $R^4$ has 1 to 12 carbon atoms and is a linear, branched, or cyclic saturated or unsaturated group selected from alkylene group, cycloalkylene group, cycloalkylalkylene group, cycloalkenylalkylene group, alkenylene group, cycloalkenylene group, cycloalkylalkenylene group, cycloalkenylalkenylene group, arylene group, and aralkylene group.

With this configuration, excellent low heat generating properties can be realized.

For the rubber composition of the present disclosure, the conjugated diene-based polymer of the modified conjugated diene-based polymer is preferably styrene butadiene rubber. This can more reliably realize excellent low heat generating properties and improve other performance such as wet performance.

For the rubber composition of the present disclosure, the modifier is preferably any one of the formulas (1a) to (1e).

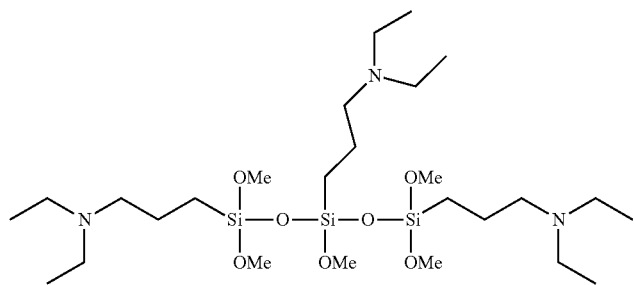
(1a)
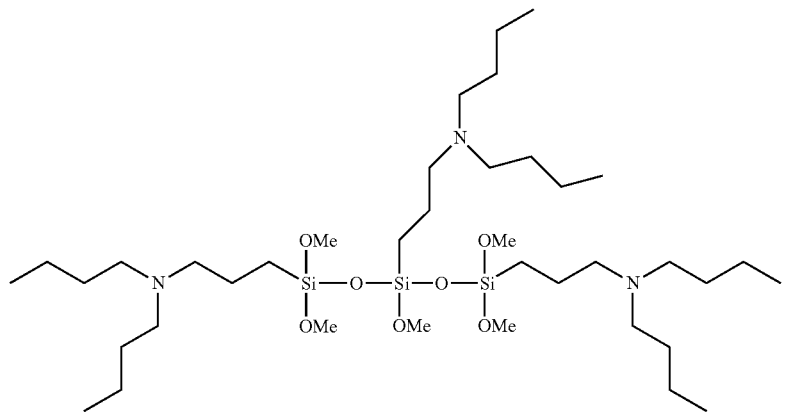
(1b)
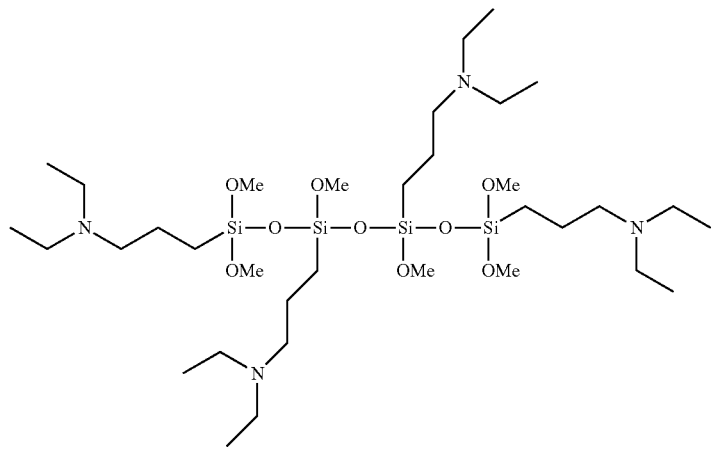
(1c)
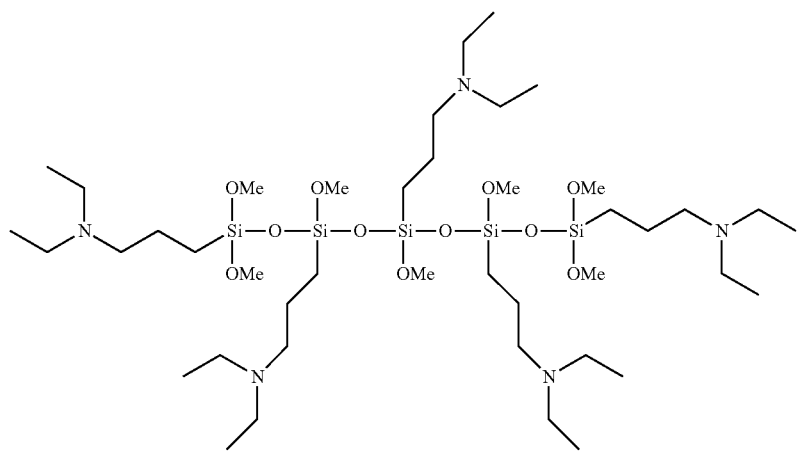
(1d)

-continued

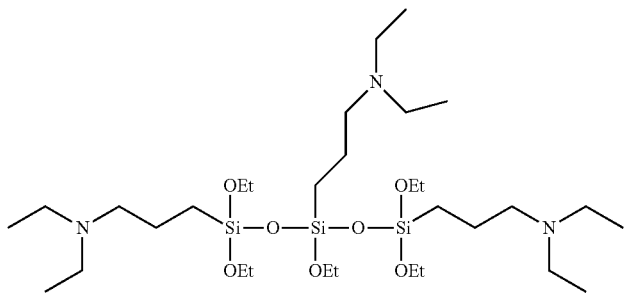
(1e)

This can realize better low heat generating properties.

The tire of the present disclosure uses the rubber composition of the present disclosure described above.

With this configuration, the rolling resistance can be greatly improved without deteriorating other performance.

Advantageous Effect

According to the present disclosure, it is possible to provide a rubber composition having excellent low heat generating properties. Further, according to the present disclosure, it is possible to provide a tire with greatly improved rolling resistance.

DETAILED DESCRIPTION

The following describes an embodiment of the present disclosure in detail.
<Rubber Composition>

The rubber composition of the present disclosure is a rubber composition containing a rubber component, a filler containing silica, and a silane coupling agent.

The following describes each component of the rubber composition of the present disclosure.
(Rubber Component)

The rubber composition of the present disclosure contains a rubber component.

It is required that the rubber component contain a conjugated diene-based polymer modified with a modifier containing a compound represented by the formula (1) (hereinafter, it may be referred to as "modified conjugated diene-based polymer").

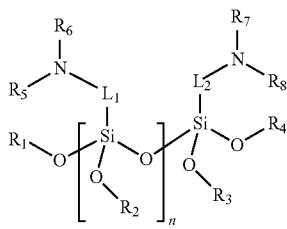
(1)

By using a conjugated diene-based polymer that has been modified with a modifier containing a compound represented by the formula (1) containing oligosiloxane, which is a filler-affinity functional group, and a tertiary amino group as the rubber component, the dispersibility of a filler such as silica can be enhanced. As a result, the low heat generating properties are greatly improved and the dispersibility of the filler is improved in the rubber composition of the present disclosure, and therefore other physical properties such as the reinforcing properties, the steering stability when applied to a tire, and the processability are not deteriorated.

In the formula (1), R1 to R8 are each an independent alkyl group having 1 to 20 carbon atoms; $L_1$ and $L_2$ are each an independent alkylene group having 1 to 20 carbon atoms; and n is an integer of 2 to 4.

Specifically, in the formula (1), R1 to R4 may each independently be a substituted or unsubstituted alkyl group having 1 to 20 carbon atoms. When the R1 to R4 are substituted, they may each independently be substituted with at least one substituent selected from the group consisting of an alkyl group having 1 to 10 carbon atoms, a cycloalkyl group having 3 to 10 carbon atoms, an alkoxy group having 1 to 10 carbon atoms, a cycloalkoxy group having 4 to 10 carbon atoms, an aryl group having 6 to 12 carbon atoms, an aryloxy group having 6 to 12 carbon atoms, an alkanoyloxy group having 2 to 12 carbon atoms (alkanoyl, RaCOO⁻, where Ra is an alkyl group having 1 to 9 carbon atoms), an aralkyloxy group having 7 to 13 carbon atoms, an arylalkyl group having 7 to 13 carbon atoms, and an alkylaryl group having 7 to 13 carbon atoms.

More specifically, the $R^1$ to $R^4$ may be a substituted or unsubstituted alkyl group having 1 to 10 carbon atoms. More specifically, the $R^1$ to $R^4$ may each independently be a substituted or unsubstituted alkyl group having 1 to 6 carbon atoms.

In the formula (1), R5 to R8 are each independently a substituted or unsubstituted alkyl group having 1 to 20 carbon atoms. Specifically, they may each independently be a substituted or unsubstituted alkyl group having 1 to 10 carbon atoms. More specifically, they may each independently be a substituted or unsubstituted alkyl group having 1 to 6 carbon atoms. When substituted, they can be substituted with a substituent as described above for R1 to R4. When R5 to R8 are not an alkyl group but a hydrolyzable substituent, the bonds of N—R5R6 and N—R7R8 may be hydrolyzed to N—H in the presence of water, which may adversely affect the processability of the polymer.

More specifically, in the compound represented by the formula (1), R1 to R4 may be a methyl group or an ethyl group, and R5 to R8 may be an alkyl group having 1 to 10 carbon atoms.

In the present disclosure, the amino group in the compound represented by the formula (1), that is, N—R5R6 and N—R7R8 are preferably a tertiary amino group. The tertiary amino group provides better processability when the compound represented by the formula (1) is used as a modifier.

Note that when a protecting group for protecting an amino group is bonded to the R5 to R8, or hydrogen is bonded to the R5 to R8, it may be difficult to obtain the effect of the compound represented by the formula (1). When hydrogen is bonded, anions react with the hydrogen during the modification and lose their reactivity, rendering the modification reaction itself impossible. When a protecting group is bonded, the modification reaction will proceed, but it is deprotected by hydrolysis during subsequent processing in a state of being bonded to the polymer terminal, resulting in a primary or secondary amino group. The deprotected primary or secondary amino group may cause a high viscosity in the product during subsequent composition and may cause a decrease in processability.

In the compound represented by the formula (1), $L_1$ and $L_2$ are each independently a substituted or unsubstituted alkylene group having 1 to 20 carbon atoms.

More specifically, $L_1$ and $L_2$ are each independently an alkylene group having 1 to 10 carbon atoms. More specifically, they may be an alkylene group having 1 to 6 carbon atoms such as a methylene group, an ethylene group, or a propylene group.

For $L_1$ and $L_2$ in the compound represented by the formula (1), the effect improves as the distance between the Si atom and the N atom in the molecule decreases. However, if Si is directly bonded to N, the bond between Si and N may be broken during subsequent processing, and a secondary amino group formed in this case is likely to be washed away by water during subsequent processing. Then, it is difficult to bond a modified conjugated diene-based polymer thus obtained to a silica filler through a member of the amino group that promotes the bond with a silica filler, which may deteriorate the dispersion effect of a dispersant. Considering the improvement effect by the length of the bond between Si and N, the $L_1$ and $L_2$ are more preferably each independently an alkylene group having 1 to 3 carbon atoms such as a methylene group, an ethylene group, or a propylene group, and more specifically, they may be a propylene group. Further, $L_1$ and $L_2$ may be substituted with a substituent as described above for R1 to R4.

The compound represented by the formula (1) is preferably, for example, any one of the compounds represented by the following formulas (1a) to (1e). This can realize better low heat generating properties.

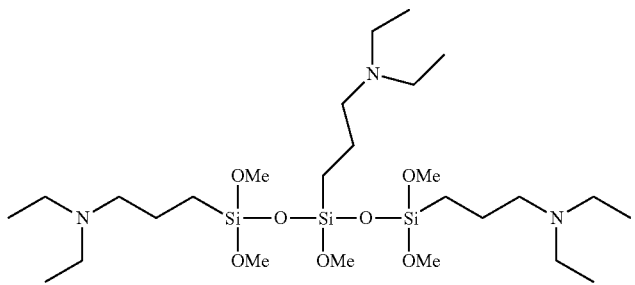

(1a)

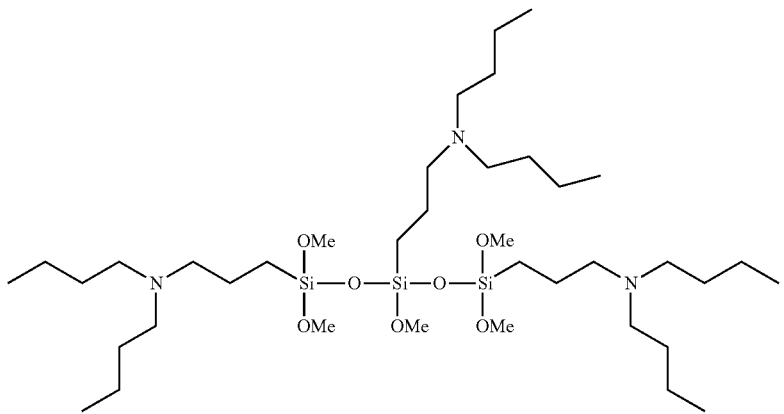

(1b)

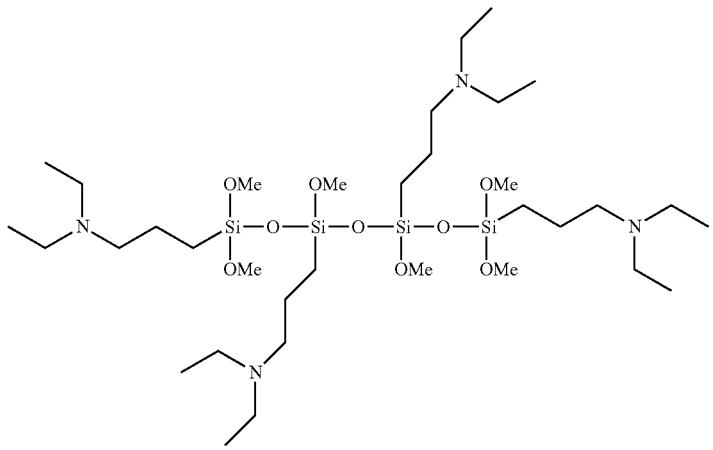

(1c)

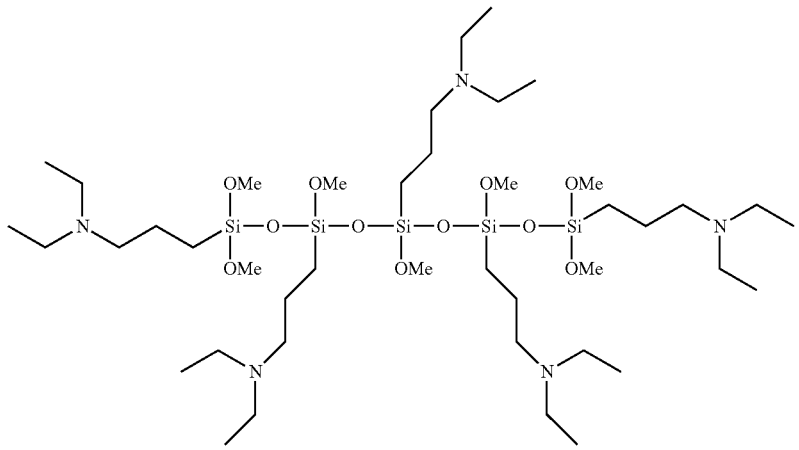

(1d)

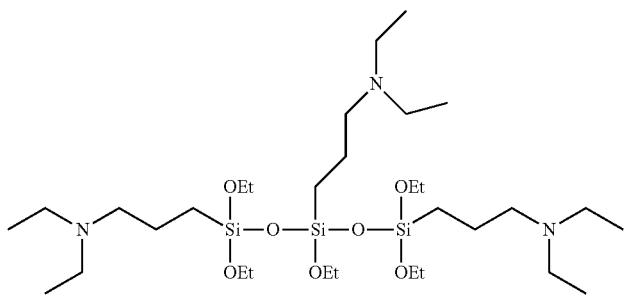

(1e)

In the compound represented by the formula (1) of the modifier of the present disclosure, an alkoxysilane structure is bonded to an activated terminal of the conjugated diene-based polymer, and a Si—O—Si structure and three or more amino groups bonded to a terminal exhibit affinity for a filler such as silica. In this way, the bond between the filler and the modified conjugated diene-based polymer can be promoted as compared with a conventional modifier containing one amino group in the molecule. Further, the degree of bonding of the activated terminal of the conjugated diene-based polymer is uniform, and it is found that, when observing the change in molecular weight distribution before and after coupling, the molecular weight distribution after coupling does not increase as compared to before coupling and is kept constant. Therefore, the physical properties of the modified conjugated diene-based polymer itself are not deteriorated, the aggregation of the filler in the rubber composition can be prevented, and the dispersibility of the filler can be improved. As a result, the processability of the rubber composition can be improved. These effects can particularly improve the fuel efficiency properties, wear properties and braking properties in a well-balanced manner when the rubber composition is applied to a tire.

Note that the compound represented by the formula (1) can be obtained through a condensation reaction represented by the following reaction formula 1.

(Reaction formula 1)

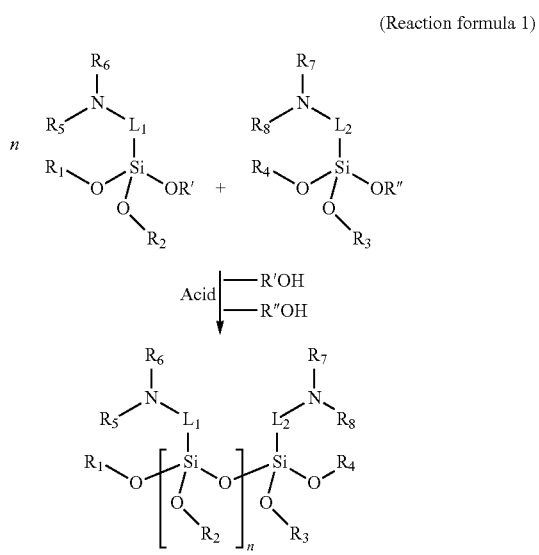

In the reaction formula 1, R1 to R8, L1 and L2, and n are the same as those defined in the formula (1) above, and R' and R" are arbitrary substituents that do not affect the condensation reaction. For example, the R' and R" may each independently be the same as any one of R1 to R4.

The reaction of the reaction formula 1 is carried out under acid conditions, and the acid is not limited if it is a common one for a condensation reaction. A person skill in the art can select an optimum acid according to all kinds of process variables such as the type of reactor in which the reaction is carried out, the starting material, and the reaction temperature.

The conjugated diene-based polymer of the conjugated diene-based polymer modified with a modifier containing a compound represented by the formula (1) is not particularly limited, and examples thereof include a homopolymer of a conjugated diene-based monomer, and a copolymer of a conjugated diene-based monomer and an aromatic vinyl-based monomer.

When the modified conjugated diene-based polymer is a copolymer, it may be a random copolymer in which structural units forming the copolymer are randomly arranged and bonded, including structural units derived from a conjugated diene-based monomer and structural units derived from an aromatic vinyl-based monomer.

For example, the modified conjugated diene-based polymer may have a narrow molecular weight distribution Mw/Mn (also referred to as polydispersity index (PDI)) of 1.1 to 3.0. When the molecular weight distribution of the modified conjugated diene-based polymer exceeds 3.0 or is less than 1.1, the tensile properties and the viscoelasticity may deteriorate when applied to the rubber composition. Considering the remarkable effect of improving the tensile properties and the viscoelasticity of the polymer by controlling the molecular weight distribution of the modified conjugated diene-based polymer, the molecular weight distribution of the modified conjugated diene-based polymer is preferably 1.3 to 2.0. Note that the modified conjugated diene-based polymer has a similar molecular weight distribution to that of the conjugated diene-based polymer before being modified with the modifier.

The molecular weight distribution of the modified conjugated diene-based polymer can be calculated from a ratio (Mw/Mn) of the weight average molecular weight (Mw) to the number average molecular weight (Mn). The number average molecular weight (Mn) is a common average of individual polymer molecular weights obtained by measuring the molecular weights of n polymer molecules and dividing the total of these molecular weights by n, and the weight average molecular weight (Mw) represents a molecular weight distribution of the polymer composition. The average of total molecular weight can be expressed in grams per mole (g/mol).

In the present disclosure, the weight average molecular weight and the number average molecular weight each are a polystyrene-equivalent molecular weight analyzed by gel permeation chromatography (GPC).

The modified conjugated diene-based polymer satisfies the above-mentioned molecular weight distribution conditions and has a number average molecular weight (Mn) of 50,000 g/mol to 2,000,000 g/mol, where the number average molecular weight may be, more specifically, 200,000 g/mol to 800,000 g/mol. The modified conjugated diene-based polymer has a weight average molecular weight (Mw) of 100,000 g/mol to 4,000,000 g/mol, where the weight average molecular weight may be, more specifically, 300,000 g/mol to 1,500,000 g/mol.

When the weight average molecular weight (Mw) of the modified conjugated diene-based polymer is less than 100,000 g/mol or the number average molecular weight (Mn) of the modified conjugated diene-based polymer is less than 50,000 g/mol, the tensile properties when applied to the rubber composition may deteriorate. When the weight average molecular weight (Mw) exceeds 4,000,000 g/mol or the number average molecular weight (Mn) exceeds 2,000,000 g/mol, the workability of the rubber composition deteriorates due to the deterioration of the processability of the modified conjugated diene-based polymer, which may render kneading difficult and may render it difficult to sufficiently improve the physical properties of the rubber composition.

More specifically, when the modified conjugated diene-based polymer of one embodiment of the present disclosure simultaneously satisfies the conditions of weight average molecular weight (Mw) and number average molecular weight (Mn) as well as the molecular weight distribution, it is possible to improve the viscoelasticity and the processability of the rubber composition when applied to a composition made of rubber in a well-balanced manner.

The modified conjugated diene-based polymer may have a vinyl group content of 5 mass % or more, specifically 10 mass % or more, and more specifically 10 mass % to 60 mass % with respect to the total weight of the polymer. When the content of the vinyl group is in the above ranges, the glass transition temperature can be adjusted to an appropriate range, and the physical properties required for a tire, such as running resistance and braking force, can be improved when applied to a tire.

At this time, the content of the vinyl group is a content in percentage of the repeating unit of a structure derived from a 1,2-added conjugated diene-based monomer rather than a 1,4-added conjugated diene-based monomer, with respect to the total weight of the conjugated diene-based polymer including a monomer having a vinyl group or a conjugated diene-based monomer.

The modified conjugated diene-based polymer may have a Mooney viscosity (MV) at 100° C. of 40 to 140, specifically 60 to 100. When the Mooney viscosity is in the above ranges, better processability can be obtained.

In the present disclosure, the Mooney viscosity can be measured using a Mooney viscometer such as Monsanto's MV2000E at 100° C. at a rotor speed of 20.02 rpm and Large Rotor. A sample used in this case may be left at room temperature (23±3° C.) for 30 minutes or longer, then 27±3 g of the sample is collected to fill the inside of a die cavity, and the measurement is carried out by operating a platen.

Further, the present disclosure can provide a method of producing the modified conjugated diene-based polymer using a modifier containing a compound represented by the formula (1).

Specifically, the method of producing the modified conjugated diene-based polymer may include a step 1) where a conjugated diene-based monomer, or an aromatic vinyl-based monomer and a conjugated diene-based monomer are polymerized in a hydrocarbon solvent in the presence of an organic alkali metal compound to obtain an active polymer in which an alkali metal is bonded to at least one terminal, and a step 2) where the active polymer is reacted with a modifier containing a compound represented by the chemical formula 1.

The step 1) is a step for obtaining an active polymer in which an alkali metal is bonded to at least one terminal, which can be carried out by polymerizing a conjugated diene-based monomer, or an aromatic vinyl-based monomer and a conjugated diene-based monomer in a hydrocarbon solvent in the presence of an organic alkali metal compound.

The polymerization in the step 1) may use a conjugated diene-based monomer alone or use a conjugated diene-based monomer and an aromatic vinyl-based monomer together as a monomer. That is, the polymer obtained with the production method of one embodiment of the present disclosure may be a homopolymer of a conjugated diene-based monomer or a copolymer derived from a conjugated diene-based monomer and an aromatic vinyl-based monomer.

The type of the conjugated diene-based monomer is not particularly limited, and it may be, for example, at least one selected from the group consisting of 1,3-butadiene, 2,3-dimethyl-1,3-butadiene, piperylene, 3-butyl-1,3-octadien, isoprene, and 2-phenyl-1,3-butadiene.

When a conjugated diene-based monomer and an aromatic vinyl-based monomer are used together as the monomer (when producing a copolymer), the conjugated diene-based monomer is preferably contained as a unit derived from the conjugated diene-based monomer in an amount of 55 mass % or more, preferably 55 mass % to 97 mass %, in a finally obtained modified conjugated diene-based polymer.

The aromatic vinyl-based monomer is not particularly limited, and it may be, for example, at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

When a conjugated diene-based monomer and an aromatic vinyl-based monomer are used together as the monomer (when producing a copolymer), the aromatic vinyl-based monomer may be used in an amount so that a unit derived from the aromatic vinyl-based monomer is contained in an amount of 45 mass % or less, specifically 3 mass % to 45 mass % in a finally obtained modified conjugated diene-based polymer.

The conjugated diene-based polymer to be modified with a modifier containing a compound represented by the formula (1) is preferably a copolymer using a conjugated diene-based monomer and an aromatic vinyl-based monomer as the monomer and more preferably styrene butadiene rubber. This can more reliably realize excellent low heat generating properties without deteriorating other performance and can improve the wet performance when applied to a tire.

When styrene butadiene rubber is used as the conjugated diene-based polymer, the amount of styrene is preferably 45 mass % or less, more preferably 3 mass % to 45 mass %, and still more preferably 10 mass % to 45 mass %.

The hydrocarbon solvent is not particularly limited, and it may be, for example, at least one selected from the group consisting of n-pentane, n-hexane, n-heptane, isooctane, cyclohexane, toluene, benzene, and xylene.

The organic alkali metal compound may be used in an amount of 0.1 mmol to 1.0 mmol with respect to 100 g of the whole monomer.

The organic alkali metal compound is not particularly limited, and it may be, for example, at least one selected from the group consisting of methyllithium, ethyllithium, propyllithium, n-butyllithium, s-butyllithium, t-butyllithium, hexyllithium, n-decyllithium, t-octyllithium, phenyllithium, 1-naphthyllithium, n-eicosyllithium, 4-butylphenyllithium, 4-tolyllithium, cyclohexyllithium, 3,5-di-n-heptylcyclohexyllithium, 4-cyclopentyllithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

The polymerization in the step 1) may be carried out by further adding a polar additive, if necessary, where the polar additive can be added in an amount of 0.001 parts by weight to 1.0 part by weight with respect to 100 parts by weight of the whole monomer. Specifically, it can be added in an amount of 0.005 parts by weight to 0.5 parts by weight, and more specifically 0.01 parts by weight to 0.3 parts by weight, with respect to 100 parts by weight of the whole monomer.

The polar additive may be, for example, at least one selected from the group consisting of tetrahydrofuran, ditetrahydrofurylpropane, diethyl ether, cycloamal ether, dipropyl ether, ethylene dimethyl ether, ethylene dimethyl ether, diethyl glycol, dimethyl ether, tertiary butoxyethoxyethane, bis(3-dimethylaminoethyl) ether, (dimethylaminoethyl) ethyl ether, trimethylamine, triethylamine, tripropylamine, and tetramethylethylenediamine.

When a conjugated diene-based monomer and an aromatic vinyl-based monomer are copolymerized using the polar additive in the production method, the difference in reaction rates may be compensated so that the formation of random copolymer is induced to be easy.

The polymerization in the step 1) can be carried out via adiabatic polymerization or isothermal polymerization.

As used herein, the adiabatic polymerization is a polymerization method including a step of charging an organic alkali metal compound and then performing polymerization by self-reaction heat without arbitrarily applying heat, and the isothermal polymerization is a polymerization method in which the organic alkali metal compound is charged and then heat is arbitrarily applied or removed to maintain a constant temperature of the polymer.

The polymerization may be carried out in a temperature range of 20° C. to 200° C., specifically in a temperature range of 0° C. to 150° C., and more specifically in a temperature range of 10° C. to 120° C.

The step 2) is a modification reaction step in which the active polymer is reacted with a modifier containing a compound represented by the formula (1) to produce a modified conjugated diene-based polymer.

At this time, the modifier containing a compound represented by the formula (1) may be the same as that described above. The compound represented by the formula (1) can be used at a ratio of 0.1 mol to 2.0 mol with respect to 1 mol of the organic alkali metal compound.

Further, the reaction in the step 2) is a modification reaction for introducing a functional group into the polymer, where each reaction may be carried out in a temperature range of 0° C. to 90° C. for 1 minute to 5 hours.

The above-mentioned production method may further include one or more steps of recovering solvent and unreacted monomers and drying after the step 2), if necessary.

The rubber component may contain a rubber component other than the conjugated diene-based polymer (hereinafter, may be referred to as "other rubber component").

The other rubber component can be appropriately selected according to the required performance. For example, it may be a natural rubber (NR) containing cis-1,4-polyisoprene; a modified natural rubber such as epoxidized natural rubber (ENR), deproteinized natural rubber (DPNR), and hydrogenated natural rubber obtained by modifying or purifying the above-mentioned common natural rubber; a synthetic rubber such as styrene-butadiene copolymer (SBR), polybutadiene (BR), polyisoprene (IR), butyl rubber (IIR), ethylene-propylene copolymer, polyisobutylene-co-isoprene, neoprene, poly (ethylene-co-propylene), poly (styrene-co-butadiene), poly (styrene-co-isoprene), poly (styrene-co-isoprene-co-butadiene), poly (isoprene-co-butadiene), poly (ethylene-co-propylene-co-diene), polysulfide rubber, acrylic rubber, urethane rubber, silicone rubber, epichlorohydrin rubber, butyl rubber, and halogenated butyl rubber; or a mixture of any one or more of the above.

The content of the conjugated diene-based polymer modified with a modifier containing a compound represented by the formula (1) in the rubber component is not particularly limited, and it may be 0.1 mass % to 100 mass %, preferably 10 mass % to 100 mass %, and more preferably 20 mass % to 90 mass %. When the content of the modified conjugated diene-based polymer is 0.1 weight % or more, the low heat generating properties can be improved while keeping other physical properties good. As a result, a formed product manufactured using the rubber composition such as a tire can more reliably obtain the effects such as fuel efficiency properties, wear properties and braking properties.

As described above, the conjugated diene-based polymer is modified with a modifier containing a compound represented by the formula (1), but it is preferably further modified with a modifier containing a compound represented by the formula (3). This can further improve the dispersibility of the filler in the rubber composition, so that both the low heat generating properties and the steering stability when applied to a tire can be achieved at a higher level, and the wear resistance and the processability can be further improved.

(3)

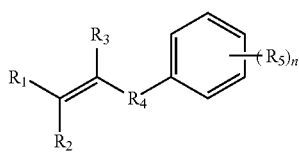

In the formula (3), $R_1$ to $R_3$ are each independently hydrogen; an alkyl group having 1 to 30 carbon atoms; an alkenyl group having 2 to 30 carbon atoms; an alkynyl group having 2 to 30 carbon atoms; a heteroalkyl group having 1 to 30 carbon atoms; a heteroalkenyl group having 2 to 30 carbon atoms; a heteroalkynyl group having 2 to 30 carbon atoms; a cycloalkyl group having 5 to 30 carbon atoms; an aryl group having 6 to 30 carbon atoms; or a heterocyclic group having 3 to 30 carbon atoms, $R_4$ is a single bond; an alkylene group having 1 to 20 carbon atoms substituted or unsubstituted with a substituent; a cycloalkylene group having 5 to 20 carbon atoms substituted or unsubstituted with a substituent; or an arylene group having 5 to 20 carbon atoms substituted or unsubstituted with a substituent, where the substituent is an alkyl group having 1 to 10 carbon atoms, a cycloalkyl group having 5 to 10 carbon atoms, or an aryl group having 6 to 20 carbon atoms, $R_5$ is an alkyl group having 1 to 30 carbon atoms; an alkenyl group having 2 to 30 carbon atoms; an alkynyl group having 2 to 30 carbon atoms; a heteroalkyl group having 1 to 30 carbon atoms; a heteroalkenyl group having 2 to 30 carbon atoms; a heteroalkynyl group having 2 to 30 carbon atoms; a cycloalkyl group having 5 to 30 carbon atoms; an aryl group having 6 to 30 carbon atoms; a heterocyclic group having 3 to 30 carbon atoms; or a functional group represented by the following chemical formula (3a) or chemical formula (3b), n is an integer of 1 to 5, when at least one of $R_5$ is a functional group represented by the following chemical formula (3a) or chemical formula (3b), and n is an integer of 2 to 5, a plurality of $R_5$s may be the same as or different from each other.

(3a)

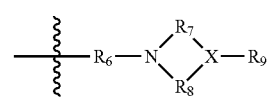

In the formula (3a), $R_6$ is an alkylene group having 1 to 20 carbon atoms substituted or unsubstituted with a substituent; a cycloalkylene group having 5 to 20 carbon atoms substituted or unsubstituted with a substituent; or an arylene group having 6 to 20 carbon atoms substituted or unsubstituted with a substituent, where the substituent is an alkyl group having 1 to 10 carbon atoms, a cycloalkyl group having 5 to 10 carbon atoms, or an aryl group having 6 to 20 carbon atoms, $R_7$ and $R_8$ are each independently an alkyl group having 1 to 10 carbon atoms, a cycloalkyl group having 5 to 10 carbon atoms, or an alkylene group having 1 to 20 carbon atoms substituted or unsubstituted with an aryl group having 6 to 20 carbon atoms, $R_9$ is hydrogen; an alkyl group having 1 to 30 carbon atoms; an alkenyl group having 2 to 30 carbon atoms; an alkynyl group having 2 to 30 carbon atoms; a heteroalkyl group having 1 to 30 carbon atoms; a heteroalkenyl group having 2 to 30 carbon atoms; a heteroalkynyl group having 2 to 30 carbon atoms; a cycloalkyl group having 5 to 30 carbon atoms; an aryl group having 6 to 30 carbon atoms; or a heterocyclic group having 3 to 30 carbon atoms, X is a N, O or S atom, when X is O or S, $R^9$ does not exist.

(3b)

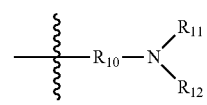

In the formula (3b), $R_{10}$ is an alkylene group having 1 to 20 carbon atoms substituted or unsubstituted with a substituent; a cycloalkylene group having 5 to 20 carbon atoms substituted or unsubstituted with a substituent; or an arylene group having 6 to 20 carbon atoms substituted or unsubstituted with a substituent, where the substituent is an alkyl group having 1 to 10 carbon atoms, a cycloalkyl group having 5 to 10 carbon atoms, or an aryl group having 6 to 20 carbon atoms, $R^{11}$ and $R^{12}$ are each independently an alkyl group having 1 to 30 carbon atoms; an alkenyl group having 2 to 30 carbon atoms; an alkynyl group having 2 to 30 carbon atoms; a heteroalkyl group having 1 to 30 carbon atoms; a heteroalkenyl group having 2 to 30 carbon atoms; a heteroalkynyl group having 2 to 30 carbon atoms; a cycloalkyl group having 5 to 30 carbon atoms; an aryl group having 6 to 30 carbon atoms; or a heterocyclic group having 3 to 30 carbon atoms.

In the compound represented by the formula (3), $R^1$ to $R_3$ may be each independently hydrogen; an alkyl group having 1 to 10 carbon atoms; an alkenyl group having 2 to 10 carbon atoms; or an alkynyl group having 2 to 10 carbon atoms, $R_4$ may be a single bond; or an unsubstituted alkylene group having 1 to 10 carbon atoms; $R_5$ may be an alkyl group having 1 to 10 carbon atoms; an alkenyl group having 2 to 10 carbon atoms; an alkynyl group having 2 to 10 carbon atoms; or a functional group represented by the following chemical formula (3a) or chemical formula (3b), in the formula (3a), $R_6$ may be an unsubstituted alkylene group having 1 to 10 carbon atoms, $R_7$ and $R_8$ may be each independently an unsubstituted alkylene group having 1 to 10 carbon atoms, $R_7$ may be an alkyl group having 1 to 10 carbon atoms; a cycloalkyl group having 5 to 20 carbon atoms; an aryl group having 6 to 20 carbon atoms; or a heterocyclic group having 3 to 20 carbon atoms, in the formula (3b), $R_{10}$ may be an unsubstituted alkylene group having 1 to 10 carbon atoms, $R^{11}$ and $R^{12}$ may be each independently an alkyl group having 1 to 10 carbon atoms; a cycloalkyl group having 5 to 20 carbon atoms; an aryl group having 6 to 20 carbon atoms; or a heterocyclic group having 3 to 20 carbon atoms.

More specifically, the compound represented by the formula (3) may be a compound represented by the following formulas (3-1) to (3-3).

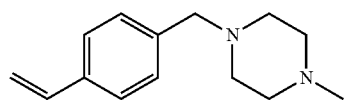
(3-1)

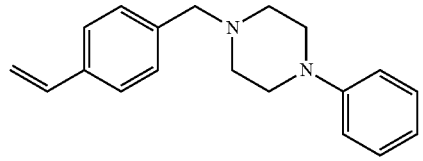
(3-2)

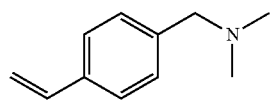
(3-3)

When the conjugated diene-based polymer is modified with a modifier containing a compound represented by the formula (3), the modifier containing a compound represented by the formula (3) is used as a modification initiator.

Specifically, by polymerizing a conjugated diene polymer, or a conjugated diene monomer and an aromatic vinyl monomer in the presence of a modifier containing a compound represented by the formula (3) in a hydrocarbon solvent, a modifying group derived from the compound represented by the formula (3) can be added to the conjugated diene-based polymer, for example.

(Filler)

The rubber composition of the present disclosure further contains a filler containing at least silica in addition to the above-described rubber component.

By using the filler containing silica together with the rubber component containing the modified conjugated diene-based polymer and the silane coupling agent described later, the dispersibility of the silica is enhanced, the performance such as strength, wear resistance, and wet grip properties is maintained at a high level, and excellent low heat generating properties can be realized at the same time.

The content of the filler is not particularly limited, but it is preferably 10 parts by mass to 160 parts by mass and more preferably 30 parts by mass to 120 parts by mass with respect to 100 parts by mass of the rubber component. This is because better low heat generating properties and wear resistance can be realized by optimizing the amount of the filler. When the content is 10 parts by mass or more, sufficient wear resistance can be obtained. When the content is 160 parts by mass or less, deterioration of low heat generating properties can be suppressed.

The CTAB (cetyltrimethylammonium bromide) specific surface area of the silica is preferably 50 $m^2/g$ or more and preferably 350 $m^2/g$ or less. When the CTAB specific surface area of the silica is 50 $m^2/g$ or more, the wear resistance is further improved, and when the CTAB specific surface area of the silica is 350 $m^2/g$ or less, the rolling resistance is reduced.

The type of the silica is not particularly limited. Examples thereof include wet silica (hydrous silicic acid), dry silica (anhydrous silicic acid), calcium silicate, and aluminum silicate, among which wet silica is preferable. These silicas may be used alone or in combination of two or more.

The wet silica may be precipitated silica. The precipitated silica is silica obtained by aggregating primary particles by, at an initial stage of production, advancing the reaction of a reaction solution in a relatively high temperature and neutral to alkaline pH range to grow silica primary particles and then controlling them to acidic pH range.

The content of the silica is not particularly limited, but it is preferably 20 parts by mass to 150 parts by mass and more preferably 40 parts by mass to 120 parts by mass with respect to 100 parts by mass of the rubber component. This is because better low heat generating properties and wear resistance can be realized by optimizing the amount of the filler. When the content is 20 parts by mass or more, sufficient wear resistance can be obtained. When the content is 150 parts by mass or less, deterioration of processability can be suppressed.

The filler preferably contains carbon black in addition to the silica. This can realize better reinforcing properties and wear resistance.

Examples of the carbon black include carbon black of GPF, FEF, SRF, HAF, ISAF, IISAF, and SAF grades.

The content of the carbon black is preferably 2 parts by mass or more and more preferably 4 parts by mass or more with respect to 100 parts by mass of the rubber component, from the viewpoint of obtaining better wear resistance. This is because the wear resistance of the rubber composition can be further improved by setting the content of the carbon black to 2 parts by mass or more with respect to 100 parts by mass of the rubber component. The content of the carbon black is preferably 160 parts by mass or less, more preferably 90 parts by mass or less, and still more preferably 70 parts by mass or less with respect to 100 parts by mass of the rubber component. This is because, by setting the content of the carbon black to 160 parts by mass or less with respect to 100 parts by mass of the rubber component, it is possible to further improve the low heat generating properties and the processability while maintaining the wear resistance at a high level.

Examples of the other filler include an inorganic compound represented by the following formula (A).

(where M is at least one selected from metals selected from the group consisting of Al, Mg, Ti, Ca and Zr, oxides or hydroxides of these metals, hydrates of these, and carbonates of these metals; and n, x, y and z are an integer of 1 to 5, an integer of 0 to 10, an integer of 2 to 5, and an integer of 0 to 10, respectively.)

Examples of the inorganic compound of the formula (A) include alumina ($Al_2O_3$) such as γ-alumina and α-alumina; alumina monohydrate ($Al_2O_3 \cdot H_2O$) such as boehmite and diaspore; aluminum hydroxide [$Al(OH)_3$] such as gibbsite and bayerite; aluminum carbonate [$Al_2(CO_3)_3$], magnesium hydroxide [$Mg(OH)_2$], magnesium oxide (MgO), magnesium carbonate ($MgCO_3$), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide [$Ca(OH)_2$], aluminum oxide magnesium ($MgO \cdot Al_2O_3$), clay ($Al_2O_3 \cdot 2SiO_2$), kaolin ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminum silicate ($Al_2SiO_5$, $Al_4 \cdot 3SiO_4 \cdot 5H_2O$, etc.), magnesium silicate ($Mg_2SiO_4$, $MgSiO_3$, etc.), calcium silicate ($Ca_2SiO_4$, etc.), aluminum calcium silicate ($Al_2O_3 \cdot CaO \cdot 2SiO_2$, etc.), calcium magnesium silicate ($CaMgSiO_4$), calcium carbonate ($CaCO_3$), zirconium oxide ($ZrO_2$), zirconium hydroxide [$ZrO(OH)_2 \cdot nH_2O$], zirconium carbonate [$Zr(CO_3)_2$], and crystalline aluminosilicate containing hydrogen, alkali metal or alkaline earth metal that corrects the charge like various zeolites.

(Silane Coupling Agent)

It is required that the rubber composition of the present disclosure further contain a silane coupling agent in addition to the above-described rubber component and filler, where the silane coupling agent is a compound represented by the formula (2).

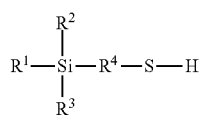

By using a conjugated diene-based polymer modified with a modifier containing a compound represented by the formula (1) as the rubber component and, at the same time, containing the silane coupling agent represented by the formula (2) in the rubber composition, the dispersibility of the filler such as silica can be significantly enhanced by the combined effect of the above. As a result, the rubber composition of the present disclosure can realize excellent low heat generating properties. Further, because the dispersibility of the filler is greatly improved in the rubber composition of the present disclosure, other physical properties such as reinforcing properties, wear resistance, and steering stability when applied to a tire can also be improved.

In the formula (2), $R^1$, $R^2$ and $R^3$ are each independently a group selected from —O—$C_jH_{2j+1}$, —(O—$C_kH_{2k}$—$)_a$—O—$C_mH_{2m+1}$, and —$C_nH_{2n+1}$, j, m and n are each independently 0 to 12, k and a are each independently 1 to 12, and $R^4$ has 1 to 12 carbon atoms and is a linear, branched, or cyclic saturated or unsaturated group selected from alkylene group, cycloalkylene group, cycloalkylalkylene group, cycloalkenylalkylene group, alkenylene group, cycloalkenylene group, cycloalkylalkenylene group, cycloalkenylalkenylene group, arylene group, and aralkylene group.

Further, at least one of the $R^1$, $R^2$ and $R^3$ in the formula (2) is preferably —O—$C_jH_{2j+1}$.

Examples of a compound represented by the formula (2) include 3-mercaptopropyltrimethoxysilane, 3-mercaptopropyltriethoxysilane, 3-mercaptopropylmethyldimethoxysilane, (mercaptomethyl) dimethylethoxysilane, (mercaptomethyl) dimethylethoxysilane, mercaptomethyltrimethoxysilane, Si363 (ethoxy (3-mercaptopropyl) bis (3,6,9,12,15-pentaoxaoctacosan-1-yloxy) silane manufactured by Evonik Degussa, and [$C_{13}H_{27}O(CH_2CH_2O)_5]_2(CH_3CH_2O)Si(CH_2)_3SH$). From the viewpoint of realizing excellent low heat generating properties, it is preferable to use Si363 (ethoxy (3-mercaptopropyl) bis (3,6,9,12,15-pentaoxaoctacosan-1-yloxy) silane and [$C_{13}H_{27}O(CH_2CH_2O)_5]_2(CH_3CH_2O)Si(CH_2)_3SH$).

Better low heat generating properties can be realized by using these silane coupling agents.

The content of the silane coupling agent is not particularly limited, but it may be 1 part by mass to 20 parts by mass with respect to 100 parts by weight of the silica. When the content of the silane coupling agent is 1 part by mass or more with respect to 100 parts by weight of the silica, the effect as a coupling agent can be sufficiently exhibited. When the content is 20 parts by mass or less with respect to 100 parts by weight of the silica, gelation of the rubber component can be prevented. From the same viewpoint, the content of the silane coupling agent may be 5 parts by mass to 15 parts by mass with respect to 100 parts by mass of the silica.

(Other Components)

The rubber composition of the present disclosure may contain other components in addition to the above-described rubber component and filler if the effect of the present disclosure is not impaired.

Examples of the other component include thermoplastic resin, plasticizer, liquid rubber, age resistor, crosslinking accelerator, crosslinking agent, crosslinking promoting aid, antiozonant, and surfactant, and additives that are commonly used in the rubber industry can be appropriately contained.

The rubber composition of the present disclosure may contain a thermoplastic resin. By containing the thermoplastic resin, the processability of the rubber composition can be improved, and additionally, it is possible to improve the braking performance on dry road surfaces and wet road surfaces when the rubber composition is used for a tire.

The type of the thermoplastic resin is not particularly limited. Examples thereof include C5-based resin, C9-based resin, C5 to C9-based resin, dicyclopentadiene-based resin, rosin-based resin, alkyl phenol-based resin, and terpene phenol-based resin.

The C5-based resin refers to a C5-based synthetic petroleum resin and refers to a solid polymer obtained by polymerizing a C5 fraction using a Friedel-Crafts catalyst such as $AlCl_3$ or $BF_3$. Specific examples thereof include a copolymer containing isoprene, cyclopentadiene, 1,3-pentadiene, 1-pentene and the like as main components, a copolymer of 2-pentene and dicyclopentadiene, and a polymer mainly composed of 1,3-pentadiene.

The C9-based resin refers to a C9-based synthetic petroleum resin and refers to a solid polymer obtained by polymerizing a C9 fraction using a Friedel-Crafts catalyst such as $AlCl_3$ or $BF_3$. Specific examples thereof include a copolymer containing indene, methylindene, α-methylstyrene, vinyltoluene and the like as main components.

The C5 to C9-based resin refers to a C5 to C9-based synthetic petroleum resin and refers to a solid polymer obtained by polymerizing a $C_5$ to $C_9$ fraction using a Friedel-Crafts catalyst such as $AlCl_3$ or $BF_3$. Examples thereof include a copolymer containing styrene, vinyltoluene, α-methylstyrene, indene and the like as main components. In the present disclosure, the C5 to C9-based resin is preferably a resin having a small amount of C9 or more components from the viewpoint of the compatibility with the rubber component. As used herein, the "small amount of C9 or more components" means that the C9 or more components in the total amount of the resin are less than 50 mass % and preferably 40 mass % or less.

The dicyclopentadiene-based resin is a petroleum resin using dicyclopentadiene in the above-mentioned C5 fraction as a main raw material. Examples thereof include products of "MARUKAREZ M" Series (M-890A, M-845A, M-990A, etc.) of Maruzen Petrochemical Co., Ltd.

The rosin-based resin may be a natural resin rosin such as gum rosin contained in crude turpentine and tall oil, tall oil rosin, and wood rosin, and it may be modified rosin, rosin derivative, or modified rosin derivative such as polymerized rosin, and partially hydrogenated rosin thereof; glycerin ester rosin, and partially hydrogenated rosin and fully hydrogenated rosin thereof; and pentaerythritol ester rosin, and partially hydrogenated rosin and polymerized rosin thereof.

The alkyl phenol-based resin is a phenol-based resin having an alkyl group. Examples thereof include an alkyl phenol-acetylene resin such as p-tert-butylphenol-acetylene resin, and an alkyl phenol-formaldehyde resin having a low degree of polymerization.

The terpene phenol-based resin is a resin that can be obtained by reacting terpenes with various phenols using a Friedel-Crafts catalyst, or by further performing condensation with formalin. The terpenes as a raw material are not particularly limited, but they are preferably monoterpene hydrocarbons such as α-pinene and limonene, more preferably those containing α-pinene, and particularly preferably α-pinene. A terpene phenol-based resin having a large proportion of phenol components is suitable for the present disclosure. These resins may be used alone or in combination of two or more.

Further, a novolak-type phenol resin is preferably contained as the phenol resin. By containing the novolak-type phenol resin, the elastic modulus in the rubber composition can be increased and the steering stability can be improved without using a curing agent and without deteriorating the wet performance.

The content of the thermoplastic resin is not particularly limited. However, from the viewpoint of improving the processability and the braking properties when applied to a tire without deteriorating the wear resistance and the reinforcing properties, it is preferably 3 parts by mass to 50 parts by mass and more preferably 5 parts by mass to 30 parts by mass with respect to 100 parts by mass of the rubber component.

The age resistor may be a known one, which is not particularly limited. Examples thereof include a phenol-based age resistor, an imidazole-based age resistor, and an amine-based age resistor. These age resistors may be used alone or in combination of two or more.

The crosslinking accelerator may be a known one, which is not particularly limited. Examples thereof include a thiazole-based vulcanization accelerator such as 2-mercaptobenzothiazole, dibenzothiazyl disulfide; a sulfenamide-based vulcanization accelerator such as N-cyclohexyl-2-benzothiazyl sulfenamide and N-t-butyl-2-benzothiazyl sulfenamide; a guanidine-based vulcanization accelerator such as diphenyl guanidine; a thiuram-based vulcanization accelerator such as tetramethyl thiuram disulfide, tetraethyl thiuram disulfide, tetrabutyl thiuram disulfide, tetradodecyl thiuram disulfide, tetraoctyl thiuram disulfide, tetrabenzyl thiuram disulfide, and dipentamethylene thiuram tetrasulfide; a dithiocarbamate-based vulcanization accelerator such as zinc dimethyldithiocarbamate; and zinc dialkyldithiophosphate. These crosslinking accelerators may be used alone or in combination of two or more.

The crosslinking agent is not particularly limited, either. Examples thereof include sulfur and a bismaleimide compound. These crosslinking agents may be used alone or in combination of two or more.

Examples of the types of the bismaleimide compound include N,N'-o-phenylene bismaleimide, N,N'-m-phenylene bismaleimide, N,N'-p-phenylene bismaleimide, N,N'-(4,4'-diphenylmethane) bismaleimide, 2,2-bis-[4-(4-maleimidephenoxy)phenyl]propane, and bis(3-ethyl-5-methyl-4-maleimidephenyl) methane. In the present disclosure, N,N'-m-phenylene bismaleimide, N,N'-(4,4'-diphenylmethane) bismaleimide and the like may be suitably used.

Examples of the crosslinking promoting aid include zinc oxide (ZnO) and a fatty acid. The fatty acid may be a saturated or unsaturated, linear or branched fatty acid. The carbon number of the fatty acid is not particularly limited, and it may be a fatty acid with 1 to 30, preferably 15 to 30 carbon atoms, for example. Specific examples thereof include naphthenic acids such as cyclohexanoic acid (cyclohexanecarboxylic acid) and alkylcyclopentane with side chains; saturated fatty acids such as hexanoic acid, octanoic acid, decanoic acid (including branched carboxylic acids such as neodecanoic acid), dodecanoic acid, tetradecanoic acid, hexadecanoic acid, and octadecanoic acid (stearic acid); unsaturated fatty acids such as methacrylic acid, oleic acid, linoleic acid, and linolenic acid; resin acids such as rosin, tall oil acid, and abietic acid. These may be used alone or in combination of two or more. In the present disclosure, zinc oxide or stearic acid may be suitably used.

A method of producing the rubber composition of the present disclosure is not particularly limited, and the rubber composition can be obtained by blending and kneading all the components (rubber component, filler, and other components) of the rubber composition.

<Tire>

A tire of the present disclosure uses the rubber composition of the present disclosure described above. By using the rubber composition of the present disclosure as a tire material, the obtained tire can obtain greatly improved rolling resistance without deteriorating other performance.

In the tire of the present disclosure, the above-described rubber composition is specifically applied to a member, and it is particularly preferable to apply the rubber composition to a tread among such tire members. A tire using the rubber composition in a tread can realize a high level of reinforcing properties (and thus wear resistance, steering stability, etc.) in addition to an effect of reducing rolling resistance. Examples of a gas to be filled in the tire of the present disclosure include normal air, air with different oxygen partial pressure, and an inert gas such as nitrogen.

EXAMPLES

The following describes the present disclosure in more detail with reference to examples, but the present disclosure is not limited to the following examples.

Example 1 and Comparative Examples 1 to 3

Samples of each rubber composition are prepared according to the chemical composition listed in Table 1. The blending amount of each component is indicated in part by mass with respect to 100 parts by mass of the rubber component.

Example 2 and Comparative Examples 1 and 2 and 4

Samples of each rubber composition are prepared according to the chemical composition listed in Table 2. The blending amount of each component is indicated in part by mass with respect to 100 parts by mass of the rubber component.

The "SBR", "modified SBR-1", and "modified SBR-2" in Table 1 are prepared under the following conditions.

(Preparation of SBR)

Continuous reactors in which three reactors are connected in series are prepared, where in the first reactor, a styrene solution in which styrene is dissolved in n-hexane at 60 mass % is injected at a rate of 7.99 kg/h, a 1,3-butadiene solution in which 1,3-butadiene is dissolved in n-hexane at 60 mass % is injected at a rate of 10.55 kg/h, n-hexane is injected at a rate of 49.11 kg/h, a 1,2-butadiene solution in which 1,2-butadiene is dissolved in n-hexane at 2.0 mass % is injected at a rate of 40 g/h, a solution in which 2,2-(di-2 (tetrahydrofuryl) propane is dissolved in n-hexane at 10 mass % is injected as a polar additive at a rate of 51.0 g/h, and a n-butyllithium solution in which n-butyllithium is dissolved in n-hexane at 10 mass % is injected at a rate of 59.0 g/h. At this time, the temperature of the first reactor is maintained at 50° C.

Next, a 1,3-butadiene solution in which 1,3-butadiene is dissolved in n-hexane at 60 mass % is injected into the second reactor at a rate of 0.95 kg/h. At this time, the temperature of the second reactor is maintained at 65° C.

The polymer is transferred to the third reactor by the second reactor, and a solution in which dichlorodimethylsilane is dissolved as a coupling agent is charged into the third reactor (coupling agent: act. Li=1:1 mol). After that, the temperature of the third reactor is maintained at 65° C.

Additionally, an IR1520 (BASF) solution dissolved at 30 mass % is injected as an antioxidant into the polymerization solution discharged from the third reactor at a rate of 167 g/h and stirred. As a result, the obtained polymer is put into warm water heated with steam and stirred to remove the solvent, thereby obtaining SBR.

As a result of measuring the microstructure of the obtained SBR, the styrene content is 41 mass %, the vinyl content of the butadiene portion is 45%, the weight average molecular weight Mw is 440,000, and the molecular weight distribution MWD is 1.6.

Production Example of Modification Initiator

Two vacuum-dried 4 L stainless steel pressure vessels are prepared. To the first pressure vessel, 944 g of cyclohexane, 161 g of a compound represented by the following chemical formula 2-1, and 86 g of tetramethylethylenediamine are charged to prepare a first reaction solution. At the same time, 318 g of liquid 20 weight % n-butyllithium, and 874 g of cyclohexane are charged into the second pressure vessel to prepare a second reaction solution. At this time, the molar ratio of the compound represented by the following chemical formula (2-1), n-butyllithium and tetramethylethylenediamine is 1:1:1. With the pressure of each pressure vessel maintained at 7 bar, the first reaction solution is injected into a first continuous channel at an injecting rate of 1.0 g/min and the second reaction solution is injected into a second continuous channel at an injecting rate of 1.0 g/min, respectively, in a continuous reactor using a mass flow meter. At this time, the temperature of the continuous reactor is maintained at −10° C., the internal pressure is maintained at 3 bar using a back pressure regulator, and the residence time in the reactor is adjusted to be within 10 minutes. The reaction is terminated to obtain a modification initiator.

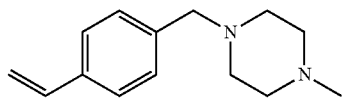

(2-1)

(Preparation of Modified SBR-1)

Continuous reactors in which three reactors are connected in series are prepared, where in the first reactor, a styrene solution in which styrene is dissolved in n-hexane at 60 weight % is injected at a rate of 7.99 kg/h, a 1,3-butadiene solution in which 1,3-butadiene is dissolved in n-hexane at 60 weight % is injected at a rate of 10.55 kg/h, n-hexane is injected at a rate of 47.66 kg/h, a 1,2-butadiene solution in which 1,2-butadiene is dissolved in n-hexane at 2.0 weight % is injected at a rate of 10 g/h, a solution in which 2,2-(di-2(tetrahydrofuryl) propane is dissolved in n-hexane at 10 weight % is injected as a polar additive at a rate of 10.0 g/h, and the modification initiator produced in the above production example is injected at a rate of 292.50 g/h. At this time, the temperature of the first reactor is maintained at 50° C. When the polymerization conversion rate reaches 43%, the polymer is transferred from the first reactor to the second reactor through a transfer pipe.

Subsequently, a 1,3-butadiene solution in which 1,3-butadiene is dissolved in n-hexane at 60 weight % is injected into the second reactor at a rate of 0.95 kg/h. At this time, the temperature of the second reactor is maintained at 65° C. When the polymerization conversion rate is 95% or more, the polymer is transferred from the second reactor to the third reactor through a transfer pipe.

The polymer is transferred from the second reactor to the third reactor, and a solution in which the following formula (1a) is dissolved as a modifier is charged into the third reactor (modifier: act. Li=1:1 mol). The temperature of the third reactor is maintained at 65° C.

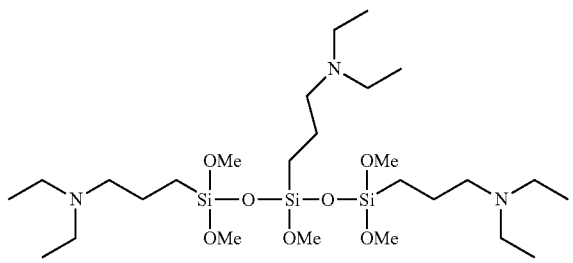

(1a)

Next, an IR1520 (BASF) solution dissolved at 30 weight % as an antioxidant is injected into the polymerization solution discharged from the third reactor at a rate of 170 g/h and stirred. As a result, the obtained polymer is put into warm water heated by steam and stirred, and the solvent is removed to obtain modified SBR-1.

As a result of measuring the microstructure of the obtained modified SBR-1, the styrene content is 41 mass %, the vinyl content of the butadiene portion is 45%, the weight average molecular weight Mw is 440,000, and the molecular weight distribution MWD is 1.6.

(Preparation of Modified SBR-2)

Continuous reactors in which three reactors are connected in series are prepared, where in the first reactor, a styrene solution in which styrene is dissolved in n-hexane at 60 weight % is injected at a rate of 7.99 kg/h, a 1,3-butadiene solution in which 1,3-butadiene is dissolved in n-hexane at 60 weight % is injected at a rate of 15.10 kg/h, n-hexane is injected at a rate of 49.11 kg/h, a 1,2-butadiene solution in which 1,2-butadiene is dissolved in n-hexane at 2.0 weight % is injected at a rate of 40 g/h, a solution in which 2,2-(di-2(tetrahydrofuryl) propane is dissolved in n-hexane at 10 weight % is injected as a polar additive at a rate of 51.0 g/h, and a n-butyllithium solution in which n-butyllithium is dissolved in n-hexane at 10 mass % is injected at a rate of 59.0 g/h. At this time, the temperature of the first reactor is maintained at 50° C.

Next, a 1,3-butadiene solution in which 1,3-butadiene is dissolved in n-hexane at 60 mass % is injected into the second reactor at a rate of 0.95 kg/h. At this time, the temperature of the second reactor is maintained at 65° C.

The polymer is transferred to the third reactor by the second reactor, and a solution in which the compound (1a) is dissolved at 10 mass % as a modifier is charged into the third reactor at a rate of 61.4 g/h. At this time, the temperature of the third reactor is maintained at 65° C.

Next, an IR1520 (BASF) solution dissolved at 30 mass % as an antioxidant is injected into the polymerization solution discharged from the third reactor at a rate of 167 g/h and stirred. As a result, the obtained polymer is put into warm water heated by steam and stirred, and the solvent is removed to obtain modified SBR-2 with one modified terminal.

As a result of measuring the microstructure of the obtained modified SBR-1, the styrene content is 41 mass %, the vinyl content of the butadiene portion is 45%, the weight average molecular weight Mw is 440,000, and the molecular weight distribution MWD is 1.6.

<Evaluation>

The following evaluations are performed on the obtained rubber composition samples of Example 1 and Comparative Example 1. The results are listed in Tables 1 and 2.

(1) Low Heat Generating Properties

The loss tangent (tan δ) of each sample is measured under conditions of a temperature of 30° C., a strain of 5%, and a frequency of 15 Hz using a dynamic viscoelasticity measuring device for high frequency manufactured by Metravib. The obtained values of tan δ of Comparative Examples 1, 3, and 4 are indicated as an index with the value of Comparative Example 1 being 100, and the obtained values of tan δ of Comparative Example 2 and Examples 1 and 2 are indicated as an index with the value of Comparative Example 2 being 100, which are listed in Tables 1 and 2. The smaller the index value of tan δ in the table is, the better the low heat generating properties are.

TABLE 1

| | | Comparative Example 1 | Comparative Example 2 | Comparative Example 3 | Example 1 |
|---|---|---|---|---|---|
| Chemical composition | NR *1 | 40 | 40 | 40 | 40 |
| | SBR | 60 | 60 | — | — |
| | Modified SBR-1 | — | — | — | — |
| | Modified SBR-2 | — | — | 60 | 60 |
| | Silica *2 | 70 | 70 | 70 | 70 |
| | Oil *3 | 10 | 10 | 10 | 10 |
| | Stearic acid *4 | 1 | 1 | 1 | 1 |
| | Wax *5 | 1.5 | 1.5 | 1.5 | 1.5 |
| | Age resistor A *6 | 1.9 | 1.9 | 1.9 | 1.9 |
| | Zinc oxide *7 | 2.5 | 2.5 | 2.5 | 2.5 |
| | Processing aid *15 | 2 | 2 | 2 | 2 |
| | Silane coupling agent A *8 | 5.6 | — | 5.6 | — |
| | Silane coupling agent B *9 | — | 7 | — | 7 |
| | Age resistor B *10 | 1.9 | 1.9 | 1.9 | 1.9 |
| | Vulcanization accelerator A *11 | 0.6 | 0.6 | 0.6 | 0.6 |
| | Vulcanization accelerator B *12 | 0.7 | 1 | 0.7 | 1 |
| | Vulcanization accelerator C *13 | 2.3 | 2.3 | 2.3 | 2.3 |
| | Sulfur *14 | 1.9 | 1.9 | 1.9 | 1.9 |
| | Vulcanization retarder *16 | — | 0.3 | — | 0.3 |
| Evaluation | Low heat generating properties | 100 | 100 | 74 | 67 |

TABLE 2

| | | Comparative Example 1 | Comparative Example 2 | Comparative Example 4 | Example 2 |
|---|---|---|---|---|---|
| Chemical composition | NR *1 | 40 | 40 | 40 | 40 |
| | SBR | 60 | 60 | — | — |
| | Modified SBR-1 | — | — | 60 | 60 |
| | Modified SBR-2 | — | — | — | — |
| | Silica *2 | 70 | 70 | 70 | 70 |
| | Oil *3 | 10 | 10 | 10 | 10 |
| | Stearic acid *4 | 1 | 1 | 1 | 1 |
| | Wax *5 | 1.5 | 1.5 | 1.5 | 1.5 |
| | Age resistor A *6 | 1.9 | 1.9 | 1.9 | 1.9 |
| | Zinc oxide *7 | 2.5 | 2.5 | 2.5 | 2.5 |
| | Processing aid *15 | 2 | 2 | 2 | 2 |
| | Silane coupling agent A *8 | 5.6 | — | 5.6 | — |
| | Silane coupling agent B *9 | — | 7 | — | 7 |
| | Age resistor B *10 | 1.9 | 1.9 | 1.9 | 1.9 |
| | Vulcanization accelerator A *11 | 0.6 | 0.6 | 0.6 | 0.6 |
| | Vulcanization accelerator B *12 | 0.7 | 1 | 0.7 | 1 |
| | Vulcanization accelerator C *13 | 2.3 | 2.3 | 2.3 | 2.3 |
| | Sulfur *14 | 1.9 | 1.9 | 1.9 | 1.9 |
| | Vulcanization retarder *16 | — | 0.3 | — | 0.3 |
| Evaluation | Low heat generating properties | 100 | 100 | 64 | 55 |

*1: Natural rubber, RSS #3

*2: "Nipsil AQ" manufactured by Tosoh Silica Corporation

*3: "Diana Process NH-70S" manufactured by Idemitsu Kiosan Co., Ltd.

*4: Kliriin stearic acid manufactured by NOF CORPORATION

*5: "SUNTIGHT A" manufactured by Seiko-Chemical Co., Ltd.

*6: "Antigen 6C" manufactured by Sumitomo Chemical Co., Ltd.

*7: "Zinc oxide 2 types" manufactured by HAKUSUI TECH CO., LTD.

*8: "ABC-856" manufactured by Shin-Etsu Chemical Co., Ltd., bis-triethoxysilylpropyl-polysulfide

*9: "Si363" manufactured by Evonik, trialkoxy mercaptoalkylsilanes represented by the following formula, [C$_{13}$H$_{27}$O(CH$_2$CH$_2$O)$_5$]$_2$(CH$_3$CH$_2$O)Si(CH$_2$)$_3$SH)

*10: "NONFLEX RD-S" manufactured by Seiko-Chemical Co., Ltd.

*11: "SOXINOL D-G" manufactured by Sumitomo Chemical Co., Ltd.

*12: "SANCELER DM-TG" manufactured by SANSHIN CHEMICAL INDUSTRY CO., LTD.

*13: "NOCCELER NS—P" manufactured by Ouchi Shinko Chemical Industrial Co., Ltd.

*14: "HK200-5" manufactured by Hosoi Chemical Industry Co., Ltd.

*15: "VP1405" manufactured by HAMBURG STRUCTOL

*16: "Retarder CTP" manufactured by Toray Industries, Inc.

From the results of Tables 1 and 2, it is understood that the samples of Examples 1 and 2 containing a modified copolymer modified with a modifier containing a compound represented by the formula (1) and containing a silane coupling agent represented by the formula (2) are excellent in low heat generating properties as compared with the samples of Comparative Examples 1 to 4. The reason is considered as that the dispersibility of silica is greatly improved by the combined effect of the modified copolymer and the silane coupling agent.

INDUSTRIAL APPLICABILITY

According to the present disclosure, it is possible to provide a rubber composition having excellent low heat generating properties. Further, according to the present disclosure, it is possible to provide a tire with greatly improved rolling resistance.

The invention claimed is:

1. A rubber composition, comprising a rubber component, a filler containing silica, and a silane coupling agent, wherein
the rubber component contains a conjugated diene-based polymer modified with a modifier containing a compound represented by the formula (1), and
the silane coupling agent is a compound represented by the formula (2),

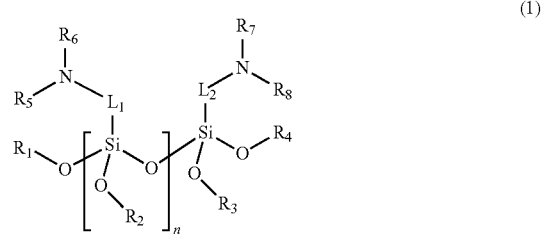

(1)

where R1 to R8 are each an independent alkyl group having 1 to 20 carbon atoms; L1 and L2 are each an independent alkylene group having 1 to 20 carbon atoms; and n is an integer of 2 to 4,

(2)

where in the formula, R$^1$, R$^2$ and R$^3$ are each independently a group selected from —O—C$_j$H$_{2j+1}$, —(O—

$C_kH_{2k}-)_a-O-C_mH_{2m+1}$, and $-C_nH_{2n+1}$, j, m and n are each independently 0 to 12, k and a are each independently 1 to 12, and $R^4$ has 1 to 12 carbon atoms and is a linear, branched, or cyclic saturated or unsaturated group selected from alkylene group, cycloalkylene group, cycloalkylalkylene group, cycloalkenylalkylene group, alkenylene group, cycloalkenylene group, cycloalkylalkenylene group, cycloalkenylalkenylene group, arylene group, and aralkylene group.

2. The rubber composition according to claim 1, wherein a conjugated diene-based polymer of the modified conjugated diene-based polymer is styrene butadiene rubber.

3. The rubber composition according to claim 1, wherein the compound represented by the formula (1) of the modifier is any one of the formulas (1a) to (1e)

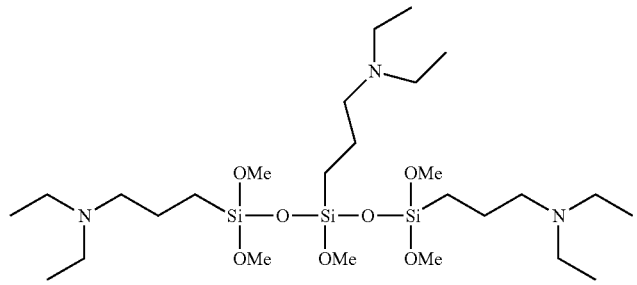
(1a)

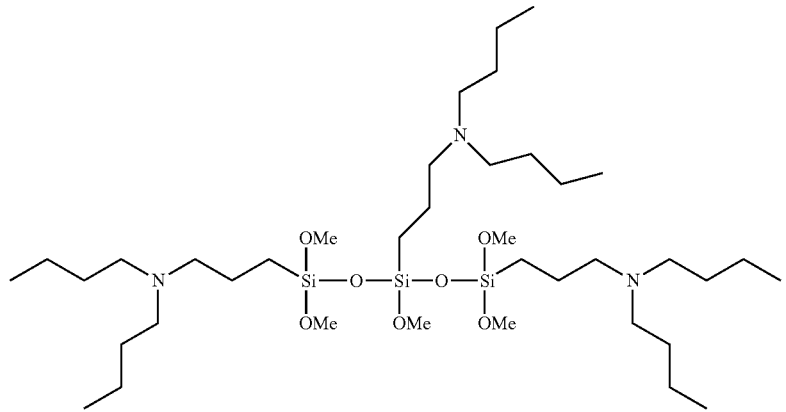
(1b)

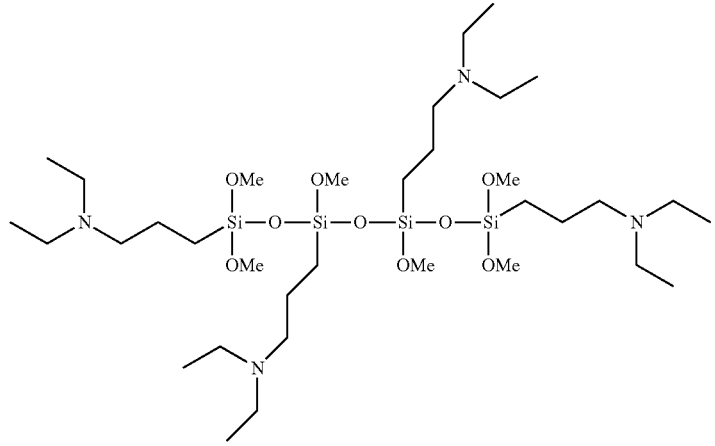
(1c)

-continued
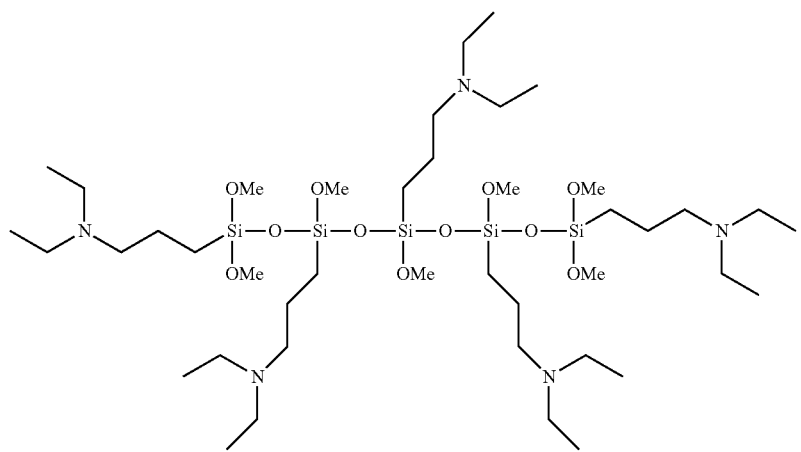
(1d)
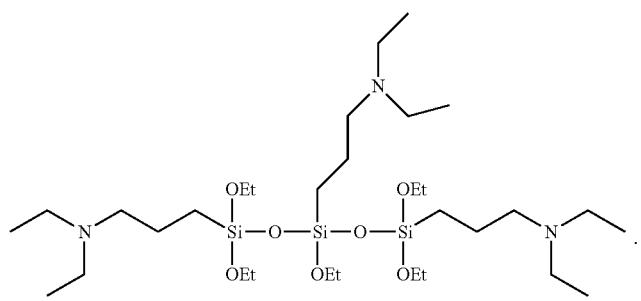
(1e)
4. A tire, using the rubber composition according to claim 1.
5. The rubber composition according to claim 2, wherein the compound represented by the formula (1) of the modifier is any one of the formulas (1a) to (1e)
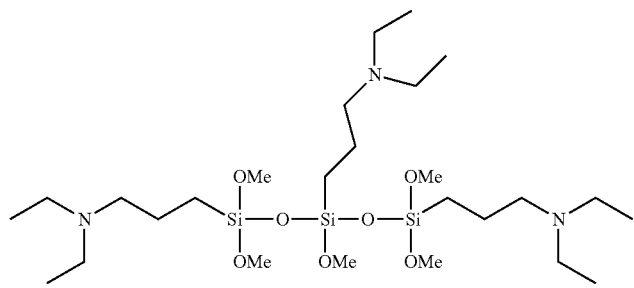
(1a)

-continued
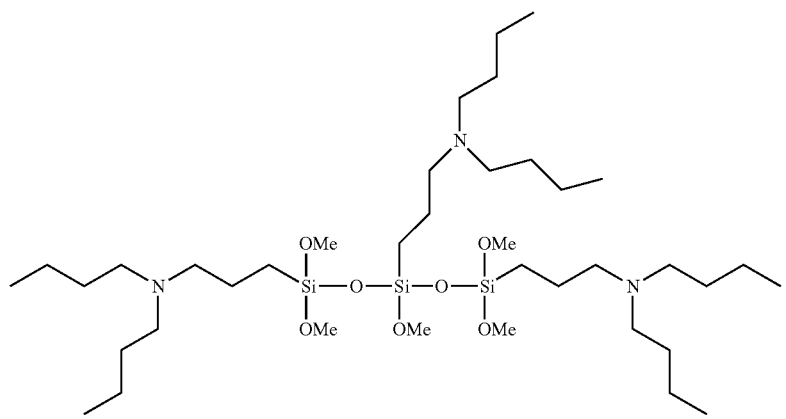
(1b)
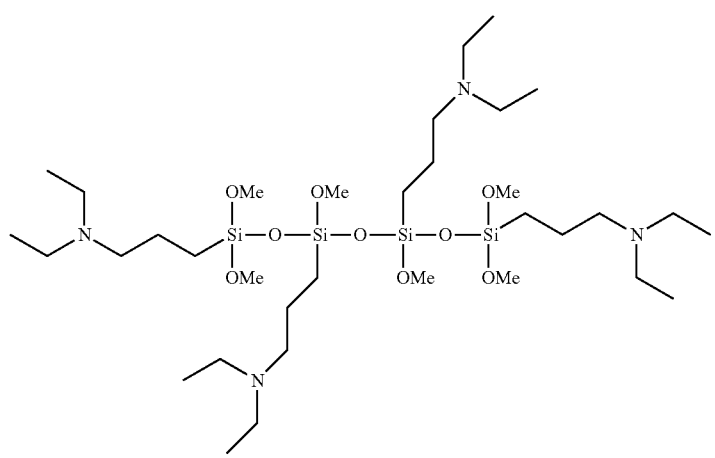
(1c)
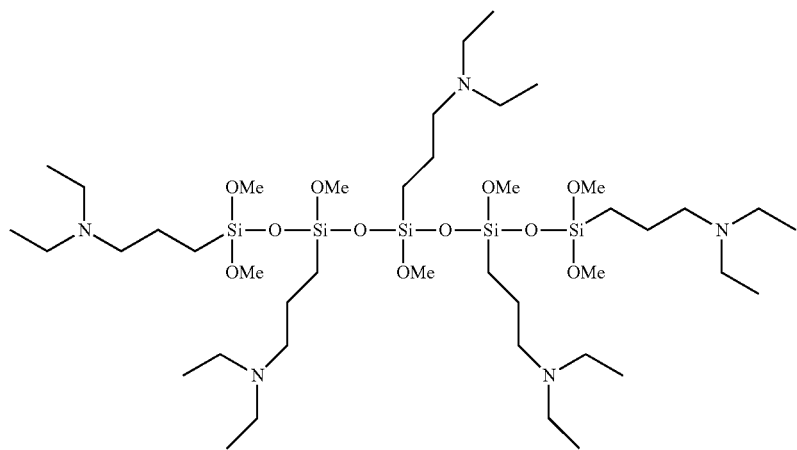
(1d)
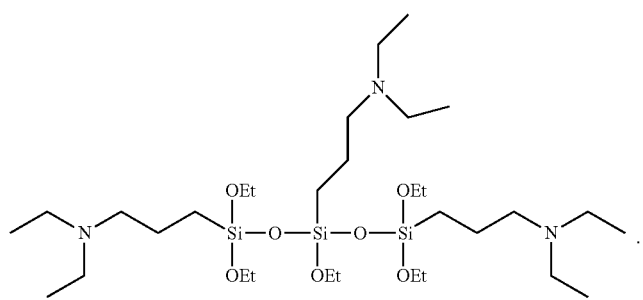
(1e)

6. A tire, using the rubber composition according to claim 2.

* * * * *